United States Patent [19]

Ishida et al.

[11] Patent Number: 4,611,247
[45] Date of Patent: Sep. 9, 1986

[54] RADIATION IMAGE REPRODUCING APPARATUS

[75] Inventors: Masamitsu Ishida; Eiichi Asai; Nobuaki Higashi, all of Kanagawa, Japan

[73] Assignee: Fuji Photo Film Company, Limited, Kanagawa, Japan

[21] Appl. No.: 521,507

[22] Filed: Aug. 8, 1983

[30] Foreign Application Priority Data

Aug. 9, 1982 [JP] Japan ................... 57-137346

[51] Int. Cl.$^4$ .................. H04N 1/40; H04N 5/30; H04N 5/32
[52] U.S. Cl. ............................ 358/280; 358/110; 358/111; 250/336.1; 250/327.2; 364/414; 128/653
[58] Field of Search ............. 358/110, 280, 111, 302; 250/327.2, 336.1, 337; 364/414; 128/653

[56] References Cited

U.S. PATENT DOCUMENTS

| | | | |
|---|---|---|---|
| Re. 31,847 | 3/1985 | Luckey | 250/327.2 |
| 3,859,527 | 1/1975 | Luckey | 250/327 |
| 4,258,264 | 3/1981 | Kotera et al. | 250/484 |
| 4,276,473 | 6/1981 | Kato et al. | 250/337 |
| 4,302,671 | 11/1981 | Kato et al. | 250/327.2 |
| 4,302,672 | 11/1981 | Kato et al. | 250/337 |
| 4,310,886 | 1/1982 | Kato et al. | 250/327.2 |
| 4,315,318 | 2/1982 | Kato et al. | 358/284 |
| 4,350,893 | 9/1982 | Takahashi et al. | 250/484.1 |
| 4,387,428 | 6/1983 | Ishida et al. | 364/414 |
| 4,439,866 | 3/1984 | Kato et al. | 378/19 |
| 4,482,924 | 11/1984 | Brownstein | 358/302 |
| 4,543,479 | 9/1985 | Kato | 250/327.2 |

OTHER PUBLICATIONS

"'81 Mitsubishi Semiconductor Devices Data Book"; May 20, 1981; p. 9-3.
D. L. Ruhberg; "Using the MC68000 and the MC6845 for a Color Graphic System"; 1981; p. 1.
"Motorola Semiconductors"; 1981; MC68000L4, MC68000L6, MC68000L8 and MC68000L10.

Primary Examiner—James J. Groody
Assistant Examiner—John K. Peng
Attorney, Agent, or Firm—Sughrue, Mion, Zinn, Macpeak, and Seas

[57] ABSTRACT

A radiation image reproducing apparatus reads a radiation image out of a first recording medium and reproduces it on a second recording medium as a visible image. Input devices of the apparatus enter input data which are associated with a method of exposing an object to a radiation and object's exposed part. In response to the input data, a processing condition determining unit determines conditions optimum for a gradation processing and a spatial frequency processing. A processor system is provided for reading the radiation image stored in the first recording medium and processing the radiation image on the basis of conditions which the processing condition determining unit determines in response to the input data associated with the radiation image.

6 Claims, 5 Drawing Figures

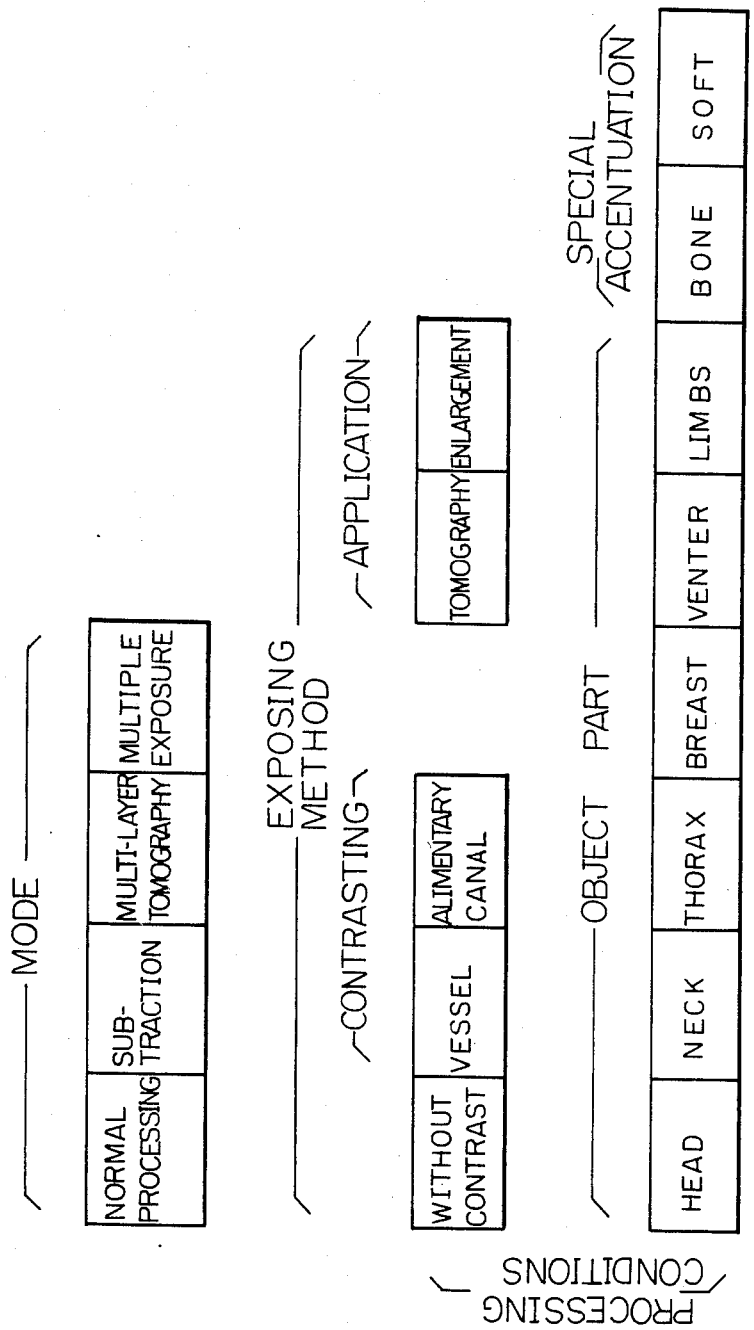

RADIATION IMAGE REPRODUCING APPARATUS

BACKGROUND OF THE INVENTION

1. Field of the Invention

The present invention relates to a radiation image reproducing apparatus and, more particularly, to a radiation image reproducing apparatus of the type which senses a radiation image of an object stored in a stimulable phosphor sheet or like recording medium to record it on another recording medium.

2. Description of the Prior Art

A radiation photographing system has been proposed, which uses a stimulable phosphor sheet as a recording medium, as disclosed in U.S. Pat. No. 3,859,527, for example. The recording medium is exposed to a radiation transmitted through an object to store a radiation image thereof. Afterwards, the recording medium is stimulated by stimulating rays so that the radiation image may be read photoelectrically to be recorded on another recording medium as a visible image of the object.

In an image reproducing apparatus applicable to the system described above, it is a usual practice to subject radiation image data read out to various image processings such as a gradation processing and a spatial frequency processing and, then, to record the processed data on a photo film or like recording medium as a hard copy, or to reproduce it as a visible image on a cathode-ray tube (CRT) or any other suitable display device.

When the stimulable phosphor sheet is exposed to an imagewise radiation of an object, information on the object and exposure is entered into the image reproducing apparatus to be stored in a file. Some of the information is read out of the file in the event of the subsequent reproduction of the object's image to be recorded as visible information on a hard copy of the reproduced image. The visible object and exposure information may be utilized for diagnoses by a doctor, for example. Such information may be typified by identification (ID) data on a patient or like object and exposure conditions which include exposed object's part and exposing method.

In the reproduction of a radiation image, it is generally desired that image processings be carried out to make the reproduced image appear easy to see for a specific application. Basically, the image processings include a gradation processing and a spatial frequency accentuating processing.

Gradation processing includes a video signal processing which controls a relationship between an optical density of a reproduced image on a recording medium and a level of a recording signal to be recorded on the recording medium, as taught in U.S. Pat. Nos. 4,276,473, 4,310,886 and 4,302,672. For example, the curvature of a curve or the gradient of a line approximating the curve as well as the level thereof are made variable to match them to specific properties of an image to be processed. Supposing that an object is the thorax of a human body, the contrast may be lowered in the region of the heart and raised in the region of the lungs in order to greatly improve the diagnostic performance for the lung region without deteriorating that for the heart region. Likewise, the contrast of the backbone may be lowered and that of the heart and lung regions raised for the purpose of facilitating visual analysis of the thorax. The configuration, either concave or convex, and gradient of the previously mentioned optical density to signal level curve, the density level and the like have to be selected out of, for example, ten different types depending upon the diagnostic purpose of a radiation image.

The spatial frequency accentuation or emphasis is an image processing for accentuating a video signal in a specific spatial frequency range when reproducing a radiation image, as described in U.S. Pat. Nos. 4,315,318 and 4,387,428, for example. When a video signal is accentuated in a very low spatial frequency range with high spatial frequency components less accentuated, the resulting image will accompany a minimum of noise components to facilitate interpretation of the image. There are, for example, ten different types of spatial frequency ranges to be accentuated and ten types of accentuation degrees, which have to be properly selected to attain a desired diagnostic purpose.

Thus, to achieve a reproduced image optimum for any diagnostic purpose, it is necessary to select one out of ten different types of gradation processings, one out of ten frequency ranges for spatial frequency accentuation and one out of ten degrees of accentuation, that is, one out of 1,000 different combinations in theory.

In this manner, image processing conditions have to be selected out of numerous combinations. Exposures to radiations are usually conducted by doctors or radiographers who are not always experts in image processing techniques. A system which forces the selection concerned on such persons will not be a system which is easy for a user to operate.

A plurality of stimulable phosphor sheets (recording layers) may be laid one upon another and exposed to radiation at the same time, as is sometimes the case with multi-layer tomography. In such a structure, the amount of absorbed radiation energy progressively decreases from the top layer toward the bottom layer, degrading the image quality and thereby the contrast accordingly. This has to be compensated for by modifying ordinary image processings to a greater degree sequentially toward the bottom layer or sheet. In practice, however, it is difficult for one who lacks full knowledge of image processings to select appropriate conditions for the modification.

SUMMARY OF THE INVENTION

It is therefore an object of the present invention to provide a radiation image reproducing apparatus which allows an optimumly processed image to be reproduced by simple manipulations without resorting to any expert knowledge.

In order to achieve this object, a radiation image reproducing apparatus in accordance with the present invention, which is of the type reading a radiation image out of a first recording medium to reproduce it on a second recording medium as a visible image, includes input means for receiving input data associated with a method of exposing an object to a radiation and object's exposed part. Processing condition determining means, in response to the input data, determines optimum conditions for a gradation processing and a spatial frequency processing. Processing means is provided for reading the radiation image stored in the first recording medium and processing the radiation image on the basis of conditions which the processing condition determining means determines in response to the input data associated with the radiation image.

BRIEF DESCRIPTION OF THE DRAWINGS

The objects and features of the present invention will become more apparent from a consideration of the following detailed description and the drawings in which:

FIG. 4 is a plan view showing an exemplary key arrangement in an operating section of a terminal unit or a console.

DESCRIPTION OF THE PREFERRED EMBODIMENTS

Figure 1:
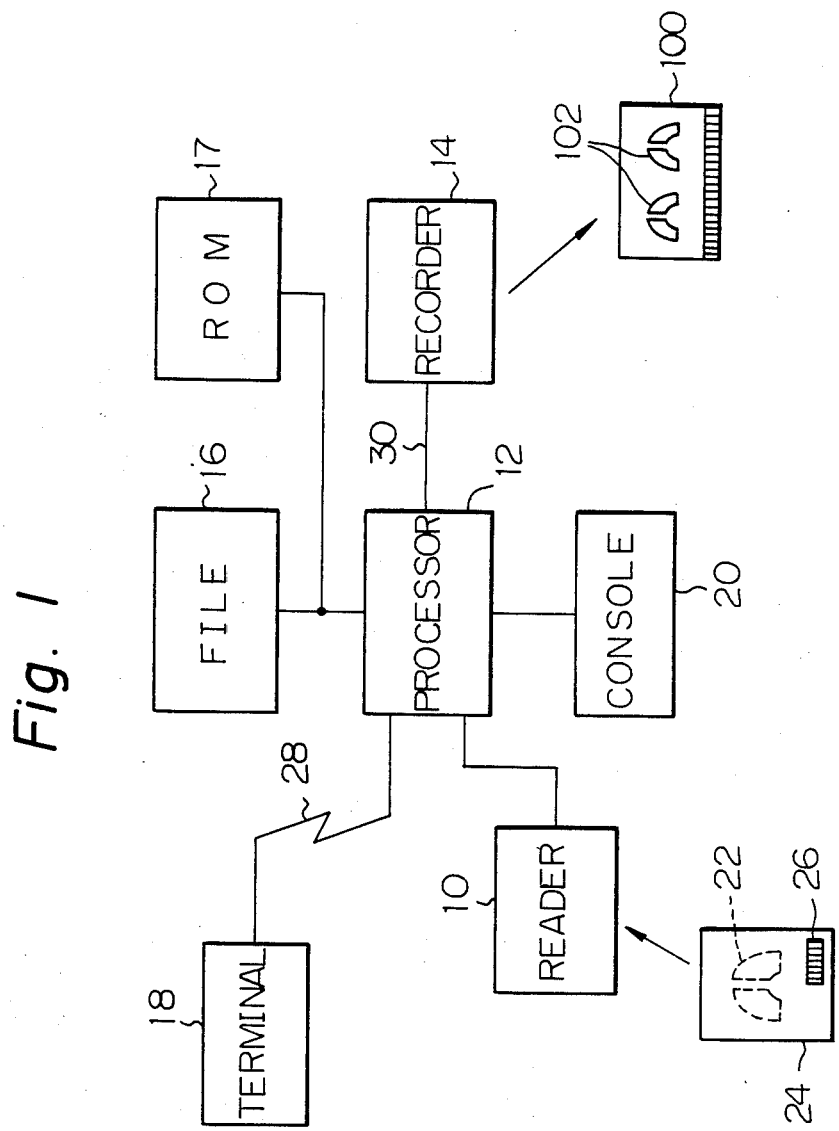
FIG. 1 is a schematic block diagram showing a radiation image reproducing apparatus in accordance with the present invention.

Referring to FIG. 1 of the drawings, a radiation image reproducing apparatus of the present invention is shown and basically comprises a reading unit 10, a processing unit 12, a recording unit 14, a file 16, a terminal unit 18 and a console 20. The image of an object is stored as a latent image 22 in an input recording medium 24, which includes a stimulable phosphor sheet, stimulated by radiation which is transmitted through the object in an exposure room or cite. The reading unit 10 exposes the recording medium 24 to stimulating rays, photoelectrically reads the resulting light, and then enters the object's image into the apparatus in the form of video signals. Usually, the recording medium 24 is encased in a cassette and a label 26 bearing identification data particular to the medium 24 is adhered to a part of the medium 24.

The terminal unit 18 serves as an input device for entering into the apparatus the identification data particular to the recording medium 24 (number of photosensitive sheet), identification data particular to an object (patient's name, sex, etc) and exposure data (exposed object's part, exposing method, etc). the terminal unit 18 is usually located in the vicinity of a radiation photographing device and connected to the processing unit 12 by a line 28, which may be a communication line or a bus. The console 20, although resembling the terminal unit 18, is located near the processing unit 12 and serves two different functions: a function of backing up the terminal unit 18 as an auxiliary input device for receiving data which are not entered through the terminal unit 18, and a system control function for entering various commands related with the maintenance and operation of the apparatus. The situations where data are not supplied through the terminal unit 18 may occur when the exposure room furnished with a photographing device is not provided with the terminal unit 18, when the terminal unit, if furnished with, was not used for some reason, or when the exposure mode is of multi-layer tomography as will be described.

The processing unit 12 is employed for processing various factors associated with images such as gradation and spatial frequency, while effecting a total control over the entire apparatus at the same time. The file 16 is a mass storage typified by a floppy disc to store various data provided through the terminal unit 18 or the console 20 as well as image signals supplied through the reading unit 10.

The recording unit 14 constitutes an image output device which subjects, for example, a laser beam to intensity modulation by image signals and other data signals output from the processor 12, so that the data may be recorded as visible data into an output recording medium 100 such as photo film. The recording medium 100 may comprise a transparent film sheet to one side of which a photosensitive emulsion is applied.

The data supplied through the terminal unit 18 or the console 20 is stored in the file 16. When the recording medium 24 is loaded in the reader 10, the medium identification data on the label 26 is read either optically or magnetically, and used to read corresponding data out of the file 16. In the meantime, the video signal representing the object's radiation image read by the reader 10 is transferred by the processor 12 to the recorder 14 to thereby be recorded into the output recording medium 100 as a reproduced image of the object.

Figure 2:
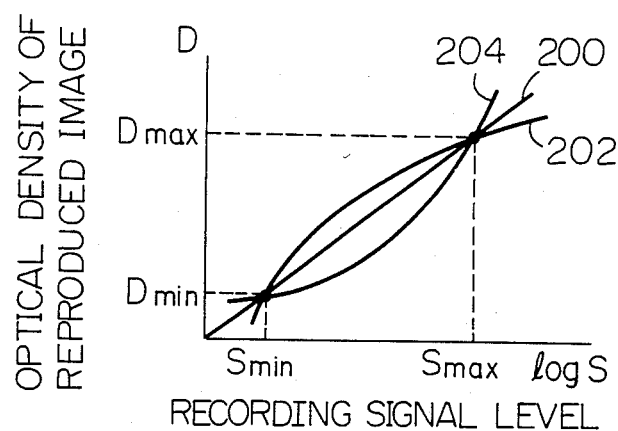
FIG. 2 is a graph showing examples of a curve which represents a relationship between a recording signal level and an optical density of a reproduced image in a gradation processing.

As previously stated, the gradation processing is a kind of image processings which controls a curve that represents a relation between record signal levels for recording the reproduced image 102 on the output recording medium 100 and optical densities of the image 102. Examples of the characteristic curve are shown in FIG. 2 in which the abscissa indicates record signal levels S in logarithmic scale and the ordinate, optical densities D in linear scale. The S-D curves of FIG. 2 commonly have a generally upward and rightward inclination which is generally accepted to be desirable in the art, as taught in U.S. Pat. No. 4,276,473, for example. To suit a specific purpose of diagnosis which uses the reproduced image 102, various parameters are selected which include the configuration of the S-D curve, such as a straight line exemplified by a line 200 in FIG. 2, a generally convex function exemplified by a curve 202 or a generally concave function exemplified by a curve 204, the gradient or curvature of a curve, etc., as well as the value of the density D for a record signal level S. In this particular embodiment, one curve may be selected out of ten different curves, for example.

Figure 3:
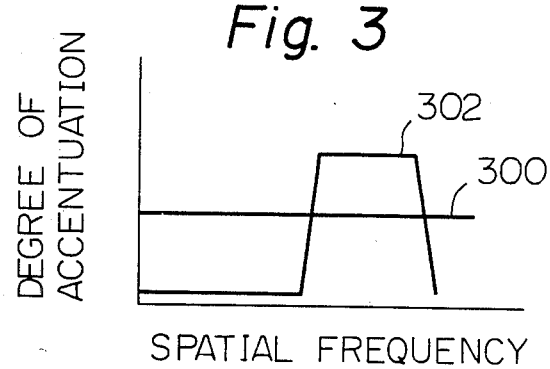
FIG. 3 is a graph showing examples of a spatial frequency range accentuation curve in a spatial frequency accentuating processing.

The spatial frequency processing, also assigned to the processor 12, is an image processing adapted to accentuate or emphasize a video signal within a specific spatial frequency range, as already described. The control parameters for this processing are the spatial frequency characteristic and the degree of accentuation. Examples of the selective accentuation are shown in FIG. 3, in which the abscissa indicates spatial frequencies (/mm) of video signals contained in the image 102 in logarithmic or linear scale and the ordinate, degrees of accentuation. Curve 300, for example, shows that the video signal is accentuated substantially evenly over the entire spatial frequency range, while curve 302 shows that the video signal is accentuated in a high spatial frequency range but not in a low spatial frequency range. In this embodiment, ten different curves are available for the spatial frequency accentuation and ten different values for the accentuation degree, by way of example. Desired ones of such parameters will be selected in conformity to a purpose of diagnosis.

In theory, therefore, the embodiment shown and described allows image processings to be performed by the processor 12 in 1,000 different kinds of combinations: ten kinds of selective gradation processings and, concerning the spatial frequency processing, ten kinds of selective spatial frequency curves and ten kinds of selective degrees of accentuation.

In accordance with the present invention, the parameters for the gradation processing and spatial frequency accentuation are selectively specified through the terminal unit 18 or the console 20 by entering data which show at least a patient's exposed portion and an exposing method. Based on the specific parameters, the gradation and spatial frequency accentuation are controlled under image processing conditions which suit a desired diagnostic purpose.

Referring to FIG. 4, there is shown an example of a key arrangement on the operating section of the terminal unit 18 or that of the console 20. Although the operating section includes keys other than these illustrated, such as an image processing start key, they are not directly relevant to the understanding of the present invention and will not be described herein.

As shown in FIG. 4, the patient's parts selectable for exposure in accordance with this embodiment are the head, neck, thorax, breast, venter and limbs. When one of such patient's parts is specified, a gradation and a spatial frequency to be accentuated will be specified automatically. What may be specified concerning the exposing method is an exposure with or without a contrast medium and, if without the contrast medium, whether the object is a blood or fluid vessel, which is generally a narrow tube, or an alimentary canal, which is generally a broad tube. Image processing conditions are specified as the patient's part to be exposed and exposing method.

Optional items to be specified are special accentuation of a bone or a soft portion, and application of tomography or enlargement. These items will be specified if necessary and are not essential. In view of the fact that bones show a low transmissivity to a radiation and soft portions a high transmissivity, either one of them may be specified to accentuate a desired portion in a reproduced image, and this will specify a condition for spatial frequency accentuation. In the case of tomography, whether the number of desired layers is one or more may be specified and, if more than one, a multi-layer tomography key in a mode command section will be operated, as will be described later. When enlargement is selected, other spatial frequency range and accentuating degree than ordinary ones will be specified for image processings in order to prevent a decrease in the contrast of the resulting image.

As shown in FIG. 4, a normal processing, a subtraction, a multi-layer tomography and a multiple exposure are available as selective processing modes.

Figure 5:
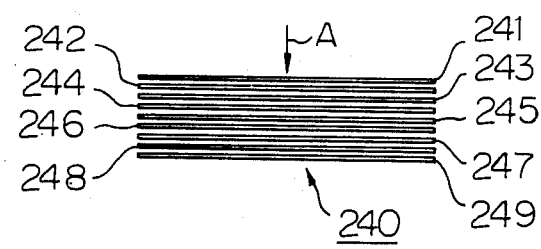
FIG. 5 is a side elevation showing an example of a stimulable phosphor sheet usable for multi-layer tomography.

For simultaneous multi-layer tomography, the multi-layer tomography key will be manipulated. For this mode of exposure, use may be made of nine stimulable phosphor sheets as shown in FIG. 5, i.e. a recording medium 240 having recording layers 241-249. An imagewise radiation from an object is incident on all the sheets 241-249 at a time. Therefore, supposing a radiation directed as indicated by an arrow A, the absorbed radiation energy becomes progressively smaller from the top layer to the bottom layer. Where such sheets are processed by the radiation image reproducing apparatus, FIG. 1, to reproduce the images, the reading unit 10 will read all the sheets one by one. Because the radiation energy distribution absorbed in the individual layers progressively decreases as mentioned, the image quality and thereby the contrast will appear progressively degraded toward the bottom sheet for common image processing conditions when reproduced by the recording unit 14.

In accordance with this embodiment, the sheets 241-249 are divided into three groups, i.e., an upper group comprising the sheets 241-243, an intermediate group comprising the sheets 244-246 and a lower group comprising the sheets 247-249. During image processing, the spatial frequency and the accentuation degree thereof will be varied from one sheet group to another.

The processor 12 is connected to a storage 17 which may be a read only memory (ROM) which stores a table for specifying certain conditions for a gradation processing and a spatial frequency accentuating processing on the basis of the previously mentioned processing conditions such as the method of exposure, exposed part and special accentuation as well as the selected mode. Alternatively, such a table may be stored in a magnetic disc in the file 16. In this specification, the parts to be exposed, exposing methods, special accentuations and mode will be generally referred to as "exposure conditions". The exposure conditions may additionally include a radiation amount, an X-ray tube voltage and a radiation time.

In the event of exposure of an object to a radiation, the terminal unit 18 will be operated to enter object data such as the number of a recording medium 24 used, patient's name, sex, chart number (patient code) and date of birth, as well as management data including the data on exposure, code of an exposure room and X-ray tube voltage. An arrangement may be made such that a number assigned to the recording medium 24 is read out of the label 26 by an optical or magnetic device installed in a radiation photographing system. A similar reading device may be employed to read object's data out of, for example, the patient's identification (ID) card or chart. In the same manner, the management data may be one which is loaded in the photographing device. The previously mentioned exposure conditions will be entered through the keys of the terminal unit 18 to be stored in the file 16.

All the recording media 24 exposed in various exposure rooms are conveyed to an image processing room or station in which the reading unit 10 is located. While reading an image 22 out of a recording medium 24, the reader 10 reads the number assigned to the medium 24 out of the label 26 optically or magnetically. The processor 12 searches for specific data stored in the file 16 indexed by the number or identification data particular to the medium 24. These data are those entered before through the terminal unit 18 or the console 20.

The processor 12 is supplied with conditions or parameters for processing the gradation and spatial frequency accentuation from the table of the ROM, on the basis of the exposure conditions which are included in the data read out of the file 16. Image processings are performed in accordance with the parameters. The processed image is recorded by the recorder 14 on the recording medium 100 as a reproduced image 102.

Where the employed mode is tomography, the sheets or recording layers 241-249 of a recording medium 240 are sequentially loaded in the reader 10 to have their radiation images entered in succession. Using a number assigned to the medium 240 as an index, the processor 12 searches for relevant data stored in the file 16 and thereby detects that the medium 240 was exposed in the multi-layer tomography mode. Then, the processor 12 processes the images in the medium 240 by modifying the usual conditions to match them to the upper sheet group 241–243, intermediate sheet group 244–246 and lower sheet group 247–249. If different numbers are assigned to the individual sheets 241–249 of the medium 240 so that the position of each sheet may be distinguished from the others within the medium 240, they may be loaded in the reader 10 in a random order in which case the processor 12 will process the images setting up conditions suitable for the individual sheets. While the processor 12 has been described as storing image processing conditions optimum for various exposure methods and parts to be exposed, it may be constructed to compute optimum image processing conditions every time data representing an exposure method and exposed part are entered. That is, the gist is that the processor 12 is furnished with means for obtaining optimum processing conditions, whether it may be a table or calculation.

In summary, it will be seen that the present invention provides a radiation image reproducing apparatus which facilitates operationability, eliminates the need for expert knowledge for image processings, and reproduces an image undergone a gradation processing and a spatial frequency accentuating processing suitable for a specific diagnostic purpose if only the data indicative of at least exposed part and an exposing method are entered. Further, in the case of multi-layer tomography, adequate image processings are achievable for each of different layers of a radiation image recording medium.

Various modifications will become possible for those skilled in the art after receiving the teachings of the present disclosure without departing from the scope thereof.

What is claimed is:

1. A radiation image reproducing apparatus comprising:
   reading means for sensing a radiation image stored in a first recording medium;
   processing means for performing image processings on the radiation image sensed by said reading means;
   recording means interconnected to said processing means for recording the processed image on a second recording medium as a visible image;
   input means for receiving input data indicative of a method of exposing an object to the first recording means and the part of the object under exposure;
   first storage means for storing optimum processing conditions associated with the data indicative of the method of exposure and the part under exposure; and
   second storage means for storing said input data;
   said input data including identification data for identifying the first recording medium;
   said processing means including means for controlling said reading means, recording means, input means, and first and second storage means;
   said processing means further including means for causing said input means to receive the identification data associated with the radiation image stored in the first storage medium, means for causing said reading means to sense the radiation image stored in the first recording medium, means for reading out of said first storage means the optimum conditions for the method of exposure and the part under exposure associated with the sensed image and processing the sensed image on the basis of the readout optimum conditions.

2. A radiation image reproducing apparatus comprising:
   reading means for sensing a radiation image stored in a first recording medium;
   processing means for performing image processings on the radiation image sensed by said reading means;
   recording means interconnected to said processing means for recording the processed image on a second recording medium as a visible image; and
   input means for receiving input data indicative of a method of exposing an object to the first recording medium and the part of the object under exposure;
   said processing means including means for determining optimum conditions for gradation processing and spatial frequency processing of the sensed image from the input data, and means for performing image processings on the radiation image on the basis of the optimum conditions.

3. An apparatus in accordance with claim 2, wherein said input data include identification data for identifying said first recording medium, said processing means further including storage means for storing the input data, means for detecting the identification data associated with said first recording medium while reading the radiation image recorded on said first recording medium, and means for reading out of said storage means the stored input data associated with the radiation image in response to the identification data.

4. An apparatus in accordance with claim 2, wherein said processing means further includes means for storing optimum processing conditions associated with data indicative of methods of exposure and parts of an object to be exposed.

5. An apparatus in accordance with claim 4, wherein said processing means includes means, responsive to input data received by the input means indicating at least one of enlargement and tomography as the method of exposure, for modifying a spatial frequency characteristic and a degree of accentuation which are contained in the optimum conditions determined by said optimum conditions determining means.

6. An apparatus in accordance with claim 4, wherein said recording medium is comprised of a plurality of recording layers, and said processing means includes means, responsive to input data received by the input means indicating multi-layer tomography as the method of exposure, for modifying a spatial frequency characteristic and a degree of accentuation which are contained in the optimum conditions determined by said optimum conditions determining means, in accordance with the positions of the recording layers forming the first recording medium.

* * * * *